Patented Aug. 21, 1951

2,564,709

UNITED STATES PATENT OFFICE 2,564,709

ELECTRICALLY CONDUCTING COATING ON GLASS AND OTHER CERAMIC BODIES

John M. Mochel, Louisville, Ky., assignor to Corning Glass Works, Corning, N. Y., a corporation of New York No Drawing. Application November 24, 1950, Serial No. 197,515

1 Claim. (Cl. 201—73)

This application, which is a continuation-in-part of my pending application Serial Number 771,859 filed September 3, 1947, relates to electric resistance devices and is particularly directed to such a device comprising a glass or other non-porous vitreous ceramic surface provided with an electrically conducting iridized metal oxide film.

Electrically conducting metal oxide films produced by iridization of glass or other vitreous ceramic surfaces have recently been found useful as the resistance elements in electric resistance devices variously adapted for heating and other purposes.

Among the metal oxides which have been proposed for such application is tin oxide, the iridized films of which possess sufficiently low resistances to make their use as electric resistance elements especially attractive. Such films are, however, subject to easy "poisoning" in that the presence of a small amount of another metal oxide such as cadmium oxide, chromium oxide, copper oxide, iron oxide, zinc oxide, and the like effects such an increase in resistance that the films may be rendered practically useless for heating purposes. Presumably, this effect is due to the higher resistance exhibited by each of such other oxides in its corresponding iridized form.

As disclosed in my pending application Serial Number 771,860 filed September 3, 1947, iridized films of indium oxide are also electrically conducting and are useful as electric resistance elements. Such a film, however, has a considerably higher resistance than an iridized tin oxide film of corresponding thickness.

I have now discovered that, despite such higher resistance, indium oxide can be combined with tin oxide in iridized form to produce films having resistances not only lower than those of corresponding indium oxide films but unexpectedly also lower than those of corresponding tin oxide films. Such lower resistance films, which find particular application as the resistance elements in electric heating devices and the like, comprise primarily indium oxide and tin oxide equivalent to approximately 0.1% to 45% $SnO_2$. A further advantage of these films is that varying amounts of other metal oxides such as those that normally poison a film of tin oxide alone can be tolerated without any substantial adverse effect on their resistances.

The present films can be produced in the same manner as corresponding films of indium oxide or tin oxide alone. The glass or other vitreous ceramic surface to be iridized is heated to an elevated temperature of on the order of about 650° C. and preferably about 700° C.; and a solution containing a compound of indium and a compound of tin in proportions on the oxide basis to provide a film having the desired resistance is directed against such heated surface, advantageously in atomized form, for a time sufficient to produce a film of the requisite thickness. Under the high temperature conditions prevailing, the indium and tin salts apparently hydrolyze or otherwise decompose instantly and are converted to the corresponding oxides, which are deposited on the glass surface and integrally unite therewith. Contact of the iridizing medium with the heated surface for a period of up to a minute or so is generally sufficient, a 10 to 20 second treatment ordinarily producing a film of the third or fourth order of thickness.

(The thickness of such a film may be gauged by the apparent color caused by the interference of light waves reflected therefrom. As the thickness of the film increases, its apparent color changes, and the order or succession of the colors with increasing thickness corresponds to that of the well-known Newton rings described at page 147 in "A Treatise on Light" by R. A. Houstoun (Longmans Green & Co. Ltd., (1938)).) The respective color sequence for each order and the thickness in Angstroms, based on red because it distinguishes the successive orders, are as follows:

| Order | Color Sequence | Thickness in Angstroms |
|---|---|---|
| 1st | white, yellow, red | 775 |
| 2nd | violet, blue, green, yellow, red | 2,320 |
| 3rd | purple, blue, green, yellow, red | 3,870 |
| 4th | green, red | 5,420 |
| 5th | greenish-blue, red | 6,970 |
| 6th | greenish-blue, pale red | 8,520 |
| 7th | greenish-blue, reddish-white | 10,070 |

Although other compounds of indium or tin may be used, the respective chlorides are preferred on account of their availability. Of the various chlorides of tin, the pentahydrate of stannic chloride, $SnCl_4 \cdot 5H_2O$, is preferable because it is an easily weighable crystalline substance. Aqueous solutions of such chlorides should contain sufficient free hydrochloric acid to prevent premature hydrolysis of the salts.

The resulting iridized glass or other ceramic surface is then provided with spaced terminals or electrodes for passage of an electric current through the film as by depositing a conventional silver metallizing paste along two opposite edges of the film and firing the same. Other means for introduction of the electric current into the film may of course be utilized for adaptation of the iridized surface as the resistance element in an electric resistance device.

The following examples are illustrative of the lowered resistances characteristic of the present films:

Examples 1 to 7

Solutions consisting of various proportions of $InCl_3$ and $SnCl_4 \cdot 5H_2O$ dissolved in dilute aqueous HCl were atomized against plates of a heat-resisting borosilicate glass maintained at 700° C. for a time adequate to produce films of the fourth order of thickness. The oxide compositions of the respective solutions and the resistances of the corresponding films are set forth below:

| Example | Per Cent $In_2O_3$ | Per Cent $SnO_2$ | Ohms per square |
|---|---|---|---|
| 1 | 99.1 | 0.9 | 10 |
| 2 | 98.2 | 1.8 | 10 |
| 3 | 96.3 | 3.7 | 12 |
| 4 | 92.6 | 7.4 | 16 |
| 5 | 85.1 | 14.9 | 51 |
| 6 | 76.6 | 23.4 | 65 |
| 7 | 52 | 48 | 286 |

By way of contrast, an iridized tin oxide film of the fourth order of thickness has a resistance of about 200 ohms per square, and an iridized indium oxide film of the same thickness has a resistance of about 500 ohms per square.

(The electrical resistance of an iridized film is conveniently expressed in "ohms per square" for a stated thickness, the resistance of a square film being independent of the size of the square. The resistance, as will be understood, varies inversely with the thickness of the film.)

The presence of a small amount of another metal oxide in the instant films does not appear to adversely affect their resistances to any substantial degree and, in fact, may serve to further lower their resistances in certain cases. The following examples are illustrative:

Example 8

A third order film produced from a solution consisting of 5.08 g. $InCl_3$, 0.28 g. $SnCl_4 \cdot 5H_2O$, 0.21 g. $CdCl_2 \cdot 2H_2O$, 8 cc. $H_2O$ and 2 cc. 37% aqueous HCl, equivalent to 93% $In_2O_3$, 3.5% $SnO_2$ and 3.5% CdO on the oxide basis, has a resistance of 55 ohms per square. In comparison, a fourth order film consisting of $SnO_2$ and 3.2% CdO has a resistance of about 600,000 ohms per square.

Example 9

A third order film produced from a solution consisting of 5.08 g. $InCl_3$, 0.28 g. $SnCl_4 \cdot 5H_2O$, 0.11 g. $CuCl_2 \cdot 2H_2O$, 8 cc. $H_2O$ and 2 cc. 37% aqueous HCl, equivalent to 95% $In_2O_3$, 3.6% $SnO_2$ and 1.4% CuO on the oxide basis, has a resistance of 133 ohms per square. In comparison, a fourth order film consisting of $SnO_2$ and 1.4% CuO has a resistance of about 450,000 ohms per square.

Example 10

A third order film produced from a solution consisting of 5.08 g. $InCl_3$, 0.28 g. $SnCl_4 \cdot 5H_2O$, 0.85 g. $FeCl_3 \cdot 6H_2O$, 8 cc. $H_2O$ and 2 cc. 37% aqueous HCl, equivalent to 89.5% $In_2O_3$, 3.4% $SnO_2$ and 7.1% $Fe_2O_3$ on the oxide basis, has a resistance of 47 ohms per square. In comparison, a fourth order film consisting of $SnO_2$ and 3% of $Fe_2O_3$ has a resistance of about 130,000 ohms per square.

Example 11

A third order film produced from a solution consisting of 5.08 g. $InCl_3$, 0.28 g. $SnCl_4 \cdot 5H_2O$, 0.053 g. $CrO_3$, 8 cc. $H_2O$ and 2 cc. 37% aqueous HCl, equivalent to 95.1% $In_2O_3$, 3.7% $SnO_2$ and 1.2% $Cr_2O_3$ on the oxide basis, has a resistance of 96 ohms per square. In comparison, a fourth order film consisting of $SnO_2$ and 4.3% $Cr_2O_3$ has a resistance of about 280,000 ohms per square.

I claim:

An electric resistance device comprising a nonporous vitreous ceramic body having on a surface thereof an electrically conducting iridized metal oxide film integrally united with the surface and comprising primarily an oxide of indium and an oxide of tin equivalent to approximately 0.1% to 45% $SnO_2$, said body being provided with spaced terminals in electrical contact with such film.

JOHN M. MOCHEL.

No references cited.